United States Patent [19]

Olson et al.

[11] Patent Number: 4,876,325

[45] Date of Patent: Oct. 24, 1989

[54] POLYIMIDE RESIN FROM BIS-IMIDE, POLYPHENOL AND DICYANDIAMIDE

[75] Inventors: Larry D. Olson, Viroqua; Eugene P. Pallardy, Jr., La Crosse, both of Wis.

[73] Assignee: Allied-Signal Inc., Morris Township, Morris County, N.J.

[21] Appl. No.: 187,158

[22] Filed: Apr. 28, 1988

[51] Int. Cl.$^4$ ............................................. C08G 73/10
[52] U.S. Cl. ..................................... 528/170; 528/171; 528/173; 528/205; 528/322
[58] Field of Search ............... 528/170, 322, 171, 173, 528/205

[56] References Cited

U.S. PATENT DOCUMENTS

| | | | |
|---|---|---|---|
| 3,562,223 | 2/1971 | Bargain et al. | 260/78 |
| 3,658,764 | 4/1972 | Bargain et al. | 260/78 |
| 3,878,172 | 4/1975 | Bargain et al. | 260/78 |
| 4,038,251 | 7/1977 | Forgo et al. | 260/47 |
| 4,043,986 | 8/1977 | Gruffaz et al. | 260/78 |
| 4,393,188 | 7/1983 | Takahashi et al. | 528/88 |
| 4,435,560 | 3/1984 | Takahashi et al. | 528/170 |
| 4,463,147 | 7/1984 | Diethelm et al. | 526/262 |
| 4,482,703 | 11/1984 | Takahashi et al. | 528/322 |
| 4,525,572 | 6/1985 | Diethelm et al. | 528/170 |
| 4,526,835 | 7/1985 | Takahashi et al. | 428/413 |

*Primary Examiner*—Harold D. Anderson
*Attorney, Agent, or Firm*—Harold N. Wells; Jay P. Friedenson

[57] ABSTRACT

A thermosetting resin is comprised of (a) a bisimide, particularly a bismaleimide, (b) a polyphenol, particularly a bisphenol, and (c) dicyandiamide. The polyphenol may be styrene-terminated (i.e. a vinyl benzyl ether of a bisphenol).

14 Claims, No Drawings

POLYIMIDE RESIN FROM BIS-IMIDE, POLYPHENOL AND DICYANDIAMIDE

FIELD OF THE INVENTION

The invention relates generally to cross-linked, heat resistant, thermosetting polyimide resins, used in the manufacture of laminates for the electronics industry. More particularly, it relates to a novel polyimide resin which avoids the aromatic diamines now in common commercial use.

PRIOR ART

Thermosetting resins prepared from bisimides and aromatic diamines used commercially are disclosed in patents assigned such as those assigned to Rhone-Poulenc, e.g., U.S. Pat. Nos. 3,562,223, 3,658,764, and 3,878,172. In some instances, such compositions are prepared as prepolymers and combined with epoxy compounds and crosslinked with dicyandiamide or other agents. Examples may be found in U.S. Patents Nos. 4,526,835, 4,525,572, 4,463,147, 4,393,188, and 4,435,560.

While resins derived from bisimides and aromatic diamines perform well in electronic laminates, they have several disadvantages. If substitute materials could be found that had improved performance, contained no free aromatic diamines, were less brittle and met UL flammability rating V-O, they should find ready acceptance in the marketplace.

Polymers from cyanamide and bisimides or mixtures of bisimides and monoimides are disclosed in U.S. Pat. No. 4,043,986. No mention is made of dicycandiamide or polyphenols as possible components of such polymers and the patent is primarily concerned with molding compounds rather than laminates for the electronics industry.

U.S. Pat. No. 4,482,703 discloses resins made with a polyvalent imide and dicyanamide compounds described by the formula NCHN-Y-NCHN where Y is a divalent organic group having an aromatic ring. Such compounds are said to produce a prepolymer (which may be further reacted with epoxy or other compounds) which combines an isomelamine ring and an imide ring which are linked to other molecules through the Y moiety and the imide nitrogen. By definition, such resins would not include dicyandiamide, which contains no Y group and, therefore, could not provide an isomelamine ring capable of being linked through such a Y group. The '703 patent also suggests ternary resins in which the dicyanamide compound and polyvalent imide are combined with a diamine.

In copending and commonly assigned application Ser. No. 850,660 thermosetting resins are produced by reacting bismaleimides (including a prepolymer chain-extended with an aromatic diamine) with styrene-terminated bisphenol (and/or the tetrabromo substituted compound). It is characteristic of these compositions to be blended together, combined with reinforcing materials, and cured to prepare laminates. Such compositions are not chemically reacted until the laminates are formed. Such resins are shown to have a desirably low dielectric constant, but they exhibit low peel strength and are too brittle and improved resins have been sought.

U.S. Pat. No. 4,038,251 discloses polymers made by reacting bismaleimides with polyhydric phenols in the presence of basic compounds, particularly amines, which are said to be catalysts. Amines are optional components of the polymers. There is no reference to dicyandiamide as a component of such polymers or recognition of its unique qualities in combination with bismaleimides and polyhydric phenols.

The present invention relates to a resin which avoids the use of aromatic diamines and yet provides better performance than resins containing such diamines.

SUMMARY OF THE INVENTION

An improved thermosetting resin suitable for use in laminates for the electronics industry is prepared from (a) a bisimide, preferably a bismaleimide, (b) a polyphenol, preferably a bisphenol, which may be styreneterminated (i.e. a vinyl benzyl ether of a bisphenol), and (c) dicyandiamide.

The resin is principally comprised of a bisimide with minor amounts of components (b) and (c). The weights of (a), (b), and (c) preferably will be between 80 to 98%/1 to 10%/0.1 to 10%, respectively, most preferably 94 to 98%/1 to 2%/1.5 to 3%, respectively, based on the total of (a), (b), and (c).

The thermosetting resin composition may comprise (a) a bisimide having the formula:

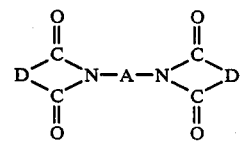

where:

A = alkylene radicals having 1 to 20 carbon atoms, cycloalkylene radicals having 4 to 40 carbon atoms, heterocyclic radicals containing at least one of O, S, and N, phenylene or polycyclic aromatic radicals.

D = divalent radicals containing a carbon-carbon double bond (b) a polyphenol, particularly a bisphenol;

(c) dicyandiamide.

In a preferred embodiment, the bisimide is a bismaleimide having the formula:

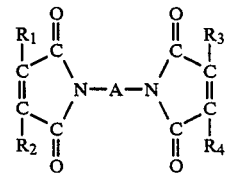

where:

$$A = -C_6H_4-CH_2-C_6H_4-, \quad -C_6H_4-\underset{\underset{CH_3}{|}}{\overset{\overset{CH_3}{|}}{C}}-C_4H_4-,$$

$$-C_6H_4-\underset{\underset{CF_3}{|}}{\overset{\overset{CF_3}{|}}{C}}-C_6H_4-, \quad -C_6H_4-O-C_6H_4-O-C_6H_4-,$$

-continued

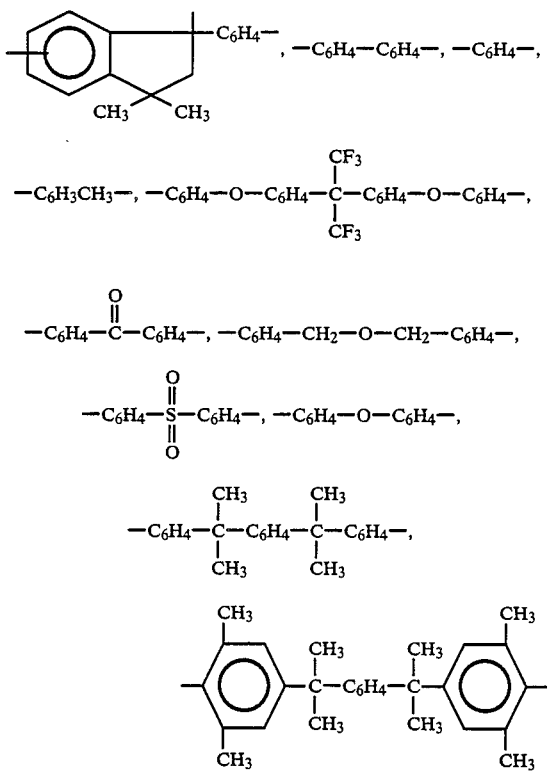

$R_1$, $R_2$, $R_3$, $R_4$ = H, $CH_3$, $C_2H_5$, $C_3H_7$, $C_4H_9$, $C_5H_{11}$ and the bisphenol has the formula

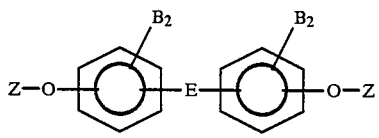

where:
Z = H, $CH_2$ =CH—$C_6H_4$—$CH_2$—

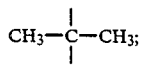

and a sigma bond B = H, Br, $CH_3$

The resin composition may comprise 1-10 mols of (a), greater than zero to 1 mols of (b), and greater than zero to 2 mols of (c).

In preferred embodiments A is —$C_6H_4$—$CH_2$—$C_6H_4$—; $R_1$, $R_2$, $R_3$, $R_4$ are each H; Z is H or $CH_2$=CH—$C_6H_4$—$CH_2$—; E is

and B is H or Br.

DESCRIPTION OF THE PREFERRED EMBODIMENTS

The thermosetting resins of the invention can replace those made by reacting a bisimide with an aromatic diamine. Such resins are polymerized and then crosslinked by use of dicyandiamide or related compounds. The present resins, however, introduce dicyandiamide as an intrinsic element of the polymer, thereby producing a superior resin, as will be seen below. Bisimides Bisimides are compounds having the general formula $D(CO)_2N$—A—$N(CO)_2D$ where D is a divalent radical containing a carbon-carbon double bond and A is a linking group which may be a divalent radical having at least 2 carbon atoms. This nomenclature is adopted from that given for such compounds in U.S. Pat. No. 3,562,223. The compounds disclosed in that patent are generally applicable in the present invention. Particularly preferred are bismaleimide (BMI) compounds where A is an isopropyl radical or an ether linkage between two phenyl radicals which are attached to the nitrogen atoms.

For purposes of the present invention, the bisimide compound will be selected to provide resins having improved toughness, low water absorption and low dielectric constant.

Resin of the invention are usually comprised mainly of the bisimide, preferably from about 80 to 98 weight%, most preferably 94 to 98 weight percent. Typically prepolymers of bisimides and aromatic diamines of the type disclosed by Rhone-Poulenc contain smaller amounts of the bisimides than are employed by the present inventors. The Rhone-Poulenc resins are said to be preferably between 1.3:1 and 5:1 bisimide/diamine (U.S. Pat. No. 3,562,223). The bisimide can react with the diamine through the unsaturated carbon-carbon bond of the imide ring, but it may also react with itself in the same manner. In the resins of the invention, a further component of the polymer chain is dicyandiamide, which is more commonly used in other resin systems as a crosslinking agent once the bisimide and diamine have formed a prepolymer. The dicyandiamide here is believed to become part of the backbone of the polymer. Dicyandiamide The compound has the formula $$\underset{\underset{}{}}{NH_2CNHC} \overset{NH}{\underset{}{\|}} \equiv N$$

It is capable of reacting with the carbon-carbon double bond of the bismaleimide to extend the polymer chain.

Only relatively small amounts of dicyandiamide are required, broadly about 0.1 to 10 wt % of the resin may be used. Preferably, about 1.5 to 3 wt. % would be reacted to form the resin.

Polyphenols

The polyphenols used in the resins of the invention preferably are bisphenols, particularly those within the following formula:

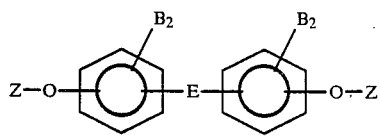

where:

Z = H, $CH_2$=CH—$C_6H_4$—$CH_2$—

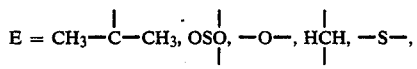

and a sigma bond B=H, Br, CH$_3$

Of particular interest are the group consisting of bisphenol A, tetrabromobisphenol A, vinyl benzyl ether of bisphenol A, and vinyl benzyl ether of tetrabromobisphenol A.

The polyphenols are present in the resin in minor amounts, preferably about 1 to 10 wt. %, most preferably 1 to 2 wt. %

Composition of the Resin

A thermosetting resin composition according to the invention may comprise (a) a bisimide having the formula:

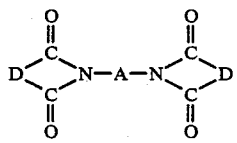

where:
- A = alkylene radicals having 1 to 20 carbon atoms, cycloalkylene radicals having 4 to 40 carbon atoms, heterocyclic radicals containing at least one of O, S, and N, phenylene or polycyclic aromatic radicals
- D = divalent radicals containing a carbon-carbon double bond
- (b) a bisphenol, and
- (c) dicyandiamide.

In a preferred embodiment the bisimide is a bismaleimide and the thermosetting resin composition may comprise (a) a bismaleimide having the formula:

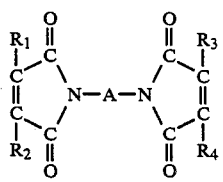

where:

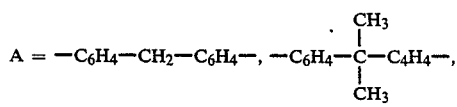

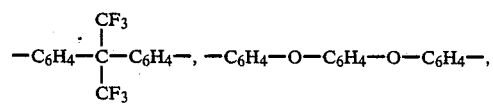

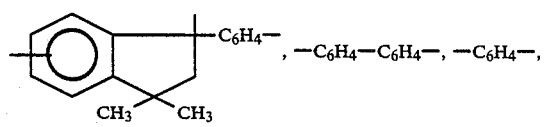

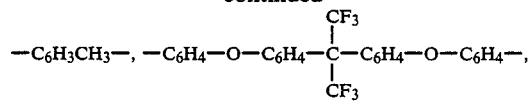

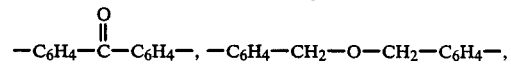

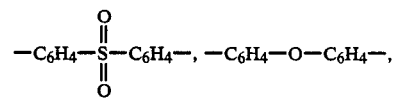

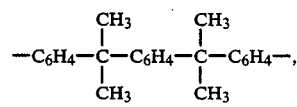

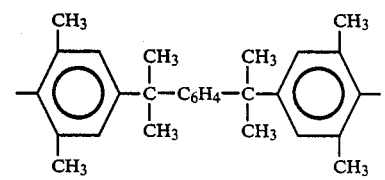

R$_1$, R$_2$, R$_3$, R$_4$=H, CH$_3$, C$_2$H$_5$, C$_3$H$_7$, C$_4$H$_9$, C$_5$H$_{11}$ and the bisphenol has the formula

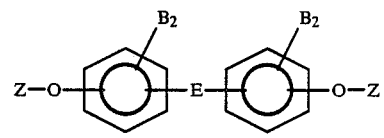

where:

Z = H, CH$_2$=CH—C$_6$H$_4$—CH$_2$—

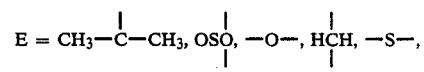

and a sigma bond B=H, Br, CH$_3$ and (c) dicyandiamide. The term "sigma bond" refers to a covalent bond between the aromatic rings and corresponds to a bisphenol in which the aromatic rings are directly joined.

The resin composition may comprise 1–10 mols of (a), greater than zero to 1 mols of (b), and greater than zero to 2 mols of (c).

In preferred embodiments A is —C$_6$H$_4$—CH$_2$—C$_6$H$_4$—; R$_1$, R$_2$, R$_3$, R$_4$ are each H; Z is H or CH$_2$=CH—C$_6$H$_4$—CH$_2$—;

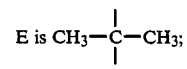

and B is H or Br.

Resin Synthesis

The resins of the invention may be prepared by reacting the three components in a solvent at an elevated temperature to form a prepolymer. One convenient procedure is to warm a suitable solvent, such as dimethyl formamide (DMF), N-methyl pyrrolidone, dimethyl acetamide, acetone, benzene, toluene, and the like to a temperature at which the chosen bismaleimide will be dissolved, say about 90° to 100° C. The bismaleimide is added to the solvent and mixed until dissolved. Then the temperature is increased to the desired reaction temperature, about 120° to 140° C., at which time the second and third components are added and mixed. The three-component mixture in the solvent will be maintained at the reaction temperature for a sufficient period of time to partially complete the reaction. Polymerization is completed during the manufacture of laminates.

Use of the Resins

The resins of the invention may be used to prepare laminates for the electronics industry by techniques generally in use in the field. Generally, the resins are diluted with a solvent and then used to impregnate a fabric such as fiberglass and dried at an elevated temperature. The resulting composite may then be laminated with other layers, such as copper foil, and then baked to fully cure the finished laminate.

In the following examples, unless otherwise specified, the resins were prepared by this procedure. Dimethyl formamide (DMF) was added to a glass flask and heated to 100° C. The bismaleimide resin was added to the DMF and the temperature returned to 100° C., when dicyandiamide and other components of the resin was added to the mixture. The flask was heated to 140° C. and maintained at that temperature until the desired degree of reaction is reached. This was determined by sampling the mixture and determining the gel time by stroke cure method on a cure plate. When the resin had a gel time of about 6-7 minutes at 171° C. the reaction was stopped by cooling the flask. The resin was then ready for use.

EXAMPLE 1

A BMI resin provided by the Monsanto Company (Skybond 3000) was reacted with dicyandiamide and a bisphenol A (BPA) according to the above procedure. The following summarizes the composition and the conditions of the reaction.

| Formula | |
| --- | --- |
| Monsanto 3000 | 150 gr. |
| Dicyandiamide | 3.75 gr. |
| Bisphenol A (BPA) | 2.25 gr. |
| DMF (solvent) | 100 gr. |
| Reaction | |
| 110 minutes at 135° C. | |
| Product | |
| Gel time - 4.15 minutes at 171° C. | |

The resin product was applied to 7628 CS 309 glass cloth provided by the Clark Schwebel Company and then B-stages in an oven for 5.5 minutes at 171° C. to yield an impregnated material containing 45.6 % (wt.) of the resin. Eight plies of the B-stage were then pressed together with copper foil on the surface at 176° C. for 2½ hours. The copper foil used was Gould JTC polyimide treatment. The laminate was postbaked at 218° C. for 32 hours.

The finished laminate was examined and found to have the following physical properties.

| Property | Value |
| --- | --- |
| Solder blister at 550° F. (288° C.) | 20 minutes + |
| Peel strength, condition A | 9.6/9.5 |
| Peel strength @ E/170° C. | 8.9/9.2 |
| $H_2O$ absorption D-24/100 | 0.87% |
| Tapered pin IR D-24/100 | $6.9 \times 10^6$ |
| Dielectric breakdown D-24/100 | 70.0 KV |
| Tg per TMA | 268° C. |
| CTE (Z-axis) | 62 ppm/°C. |
| Flammability | 8.3/14.0 |
| Retained resin | 40.8% |

EXAMPLE 2

The above example was repeated with a revised composition and conditions with the results given below:

| Formula | |
| --- | --- |
| Monsanto 3000 | 200 gr. |
| STTBBPA (1) | 6 gr. |
| Dicyandiamide | 5 gr. |
| DMF | 132 gr. |
| Reaction | |
| 205 minutes at 120° C. | |
| Product | |
| gel time - 5 minutes at 171° C. | |

(1) Styrene-terminated tetrabromo bisphenol A (a vinyl benzyl ether of tetrabromo bisphenol A).

The resin product was applied to 7628 CS 309 glass supplied by Clark Schwebel Company as in Example 1, with the impregnated materials having 40 wt. % resin. The B-stage was cured for 4 −¼ minutes at 171° C. and then pressed at 176° C. for 3 hours as described in Example 1. Gould JTC polyimide treatment copper foil was used. The laminate was postbaked for 24 hours at 218° C.

The finished laminate was examined and found to have the following physical properties.

| Property | Value |
| --- | --- |
| Solder blister at 288° C. | 20 minutes + |
| Peel strength, condition A | 10.3/10.2 |
| Peel strength, @ E/170° C. | 8.7/8.7 |
| $H_2O$ absorption D-24/100 | 0.68% |
| Tapered Pin IR D-24/100 | $2.8 \times 10^6$ |
| Dielectric breakdown D-24/100 | 62.0 KV |
| Tg per TMA | 256° C. |
| CTE - Z-axis | 62 ppm/°C. |
| Flammability | 0.50/3.0 |
| Retained resin | 34.9% |
| Dielectric constant @ 1 MHz | 4.50 |
| Dissipation factor @ 1 MHz | 0.010 |
| Prepreg volatiles @ 300° C. | 3.29% |
| Prepreg volatiles @ 225° C. | 3.22% |

EXAMPLE 3

A series of compositions were prepared corresponding to Example 2 which varied in the proportions of STTBBPA and dicyandiamide. The formulations and their preparation are summarized below, along with some of the properties of the finished laminates.

|  | A | B | C | D |
|---|---|---|---|---|
| Formulation | | | | |
| M-3000, g | 150 | 150 | 150 | 150 |
| STTBBPA, g | 2.25 | 6.75 | 6.75 | 2.25 |
| Dicyandiamide, g | 2.25 | 5.63 | 1.87 | 5.63 |
| DMF, g | 100 | 100 | 100 | 100 |
| Processing | | | | |
| Resin solids | 60.7% | 61.9% | 61.3% | 61.2% |
| Synthesis time | 240 min. | 110 min. | 160 min. | 135 min. |
| Resin Gel | | | | |
| Time @ 171° C. | 4.24 min. | 5.36 min. | 4.41 min. | 4.04 min. |
| Viscosity | 1068 cp | 958 cp | 1360 cp | 1040 cp |
| Resin Content | 43.1% | 45.2% | 43.7% | 45.5% |
| Cure Time @ 171° C. | 5¼ min. | 6 min. | 5¾ min. | 5 min. |
| Press Cycle @ 176° C. | 2½ hrs. | 2½ hrs. | 2½ hrs. | 2½ hrs. |
| Postbake @ 218° C. | 24 hrs. | 24 hrs. | 24 hrs. | 24 hrs. |
| Properties | | | | |
| Solder Blister @ 288° C. | 185 sec. | 36 sec. | 326 sec. | 40 sec. |
| Flammability (ave/long) | 7.5/17.5 sec. | 2.4/7.0 sec. | 2.8/6.0 sec. | 6.2/10.0 sec. |

It was concluded that the presence of STTBBPA controls the flammability characteristics of the finished laminate. A UL flammability rating of V-O can be achieved. The solder blister properties are important to the laminate applications. The solder blister improves as dicyandiamide concentration is reduced to 1.87 g.

EXAMPLE 4

(Comparative)

In order to show the importance of the relatively small amount of dicyandiamide as used in the previous formulations, the Monsanto BMI resin of Examples 1-3 was combined with only 2.91 wt. % STTBBPA in DMF solvent. The resin solids were 60.7%. The synthesis was carried out for 15 hours at 135° C. but no gel times could be measured indicating that essentially no resin had formed. This example illustrates that at least some dicyandiamide is essential in order for the reaction to proceed.

EXAMPLE 5

A formulation similar to those of Examples 1 - 3 was prepared using a bismaleimide in which the linking group A is diphenyl methane, designated XU-292A by CibaGeigy, its supplier. A laminate was prepared generally as previously described. Pertinent data are summarized below.

| Formulation | |
|---|---|
| XU-292A, g | 150 |
| STBPA, g (1) | 4.5 |
| Dicyandiamide | 3.75 |
| DMF | 75 |
| Processing | |
| Resin solids | 67.8% |
| Synthesis time | 180 min. |
| Resin gel time time @ 171° C. | 5¼ min. |
| Resin content | 45.9% |
| Cure time @ 166° C. | 4½ min. |
| Press cycle @ 176° C. | 17 hrs. |
| Postbake @ 218° C. | 32 hrs. |
| Properties (laminate) | |
| Solder blister @ 288° C. | 120 min. + |
| Peel strength, condition A | 7.2/7.0 |
| Peel strength, @ E/170° C. | 6.6/6.6 |
| H$_2$O absorption D-24/100 | 1.86% |
| Tapered pin IR D-24/100 | 7.3 × 10$^6$ |
| Dielectric breakdown D-24/100 | 73.0 KV |

-continued

| | |
|---|---|
| Tg per TMA | 273° C. |
| CTE-Z-axis | 45.8 ppm/°C. |
| Flammability | 2.9/5.4 |
| Retained resin | 40.3% |
| Dielectric constant @ 1 MHz | 4.86 |
| Dissipation factor @ 1 MHz | 0.011 |

(1) Styrene-terminated bisphenol A (a vinyl benzyl ether of bisphenol A).

EXAMPLE 6

The BMI of Examples 4 and 5 was formulated with thiodiphenol and dicyandiamide following the general procedures of the previous experiments. A laminate was produced and tested as in the previous experiments. The pertinent data is summarized below.

| Formulation | |
|---|---|
| XU-292A, g | 100 |
| Thiodiphenol, g | 3.5 |
| Dicyandiamide, g | 2.5 |
| DMF, g | 65 |
| Processing | |
| Resin solids | 62% |
| Synthesis time | 75 min. |
| Resin gel time @ 171° C. | 4.5 min. |
| Resin content | 46.8% |
| Cure time @ 166° C. | 4.5 min. |
| Press cycle @ 176° C. | 2½ hrs. |
| Postbake @ 218° C. | 32 hrs. |
| Properties (laminate) | |
| Solder blister @ 288° C. | 150 min.+ |
| Peel strength, condition A | 7.3/6.7 |
| Peel strength @ E/170 | 6.7/6.7 |
| H$_2$O absorption D-24/100 | 1.24% |
| Tapered pin IRD-24/100 | 2.3 × 10$^6$ |
| Dielectric breakdown D-24/100 | 69.3 KV |
| Tg per TMA | 345° C. |
| CTE-Z-axis | 91.2 ppm/°C. |
| Flammability | 6.0/12.9 |
| Retained resin | 43.2% |
| Dielectric constant @ 1 MHz | 4.77 |
| Dissipation factor @ 1 MHz | 0.014 |

EXAMPLE 7

(Comparative)

The BMI of Examples 5, 6, and 7 was formulated with an epoxy endcapped with dicyandiamide and additional dicyandiamide, following the procedures previously described. A laminate was made with the resin and tested as before. The pertinent data are reported in the following table.

| Formulation | |
|---|---|
| XU-292A, g | 100 |
| Shell 829 epoxy endcapped with dicyandiamide, g | 3.3 |
| Dicyandiamide, g | 2.5 |
| DMF, g | 65 |
| Processing | |
| Resin solids | 60% |
| Synthesis time | 80 min. |
| Resin gel time @ 171° C. | 3 min. |
| Resin content | 41.9% |
| Cure time @ 166° C. | 3 min. |
| Press cycle @ 176° C. | 2½ hrs. |
| Postbake @ 218° C. | 32 hrs. |
| Properties (laminate) | |
| Solder blister @ 288° C. | 67 min. |
| Peel strength, condition A | 6.7/6.8 |
| Peel strength @ E/170 | 5.8/6.0 |
| H$_2$O absorption D-24/100 | 1.89% |
| Tapered pin IR D-24/100 | 8.2 × 10$^5$ |
| Dielectric breakdown D-24/100 | 40.5 KV |
| Tg per TMA | 330° C. |
| CTE-Z-axis | 84 ppm/°C. |
| Retained resin | 38.7% |
| Dielectric constant @ 1 MHz | 4.44 |
| Dissipation factor @ 1 MHz | 0.009 |

The laminate was found to have lower peel strength than desired, plus relatively high water absorption and thermal expansion.

EXAMPLE 8

(Comparative)

The Ciba-Geigy BMI was formulated with ethylene diamine and dicyandiamide following the procedures previously described. A laminate was made from the resin and tested as before, with the pertinent data summarized below.

| Formulation | |
|---|---|
| XU-292A, g | 150 |
| Ethylenediamine, g | 4.5 |
| Dicyandiamide, g | 3.75 |
| DMF, g | 75 |
| Processing | |
| Resin solids | 67.8% |
| Synthesis time | 113 min. |
| Resin gel time @ 171° C. | 4½ min. |
| Resin content | 48.1% |
| Cure time @ 166° C. | 3¾ min. |
| Press cycle @ 176° C. | 2½ hrs. |
| Postbake @ 218° C. | 32 hrs. |
| Properties (laminate) | |
| Solder blister @ 288° C. | 842 sec. |
| Peel strength, condition A | 6.8/6.7 |
| Retained resins | 44.9% |

The laminate had a solder blister test result which was undesirably low.

EXAMPLE 9

Comparative

A laminate was prepared with only dicyandiamide and a bismaleimide and lacking the polyphenol required in resins according to the invention. Forty (40) grams of XU-292A from Ciba-Geigy was added to 66 grams of DMF in a flask and heated to above 70° C. Then 20 grams of dicyandiamide was added and the temperature raised to 130° C. and held for 45 minutes. The resin product was applied to 7628 CS309 glass cloth and B-staged in an oven for 2 minutes at 165° C. A second sample was given a second coating of resin after 1 minute in the oven and then returned to the oven for another minute. A laminate having copper foil on each side was prepared from each sample and pressed at 170° C. for 1 hour. The samples were then postbaked for 16 hours at 176°, 204°, and 218° C. All samples showed very weak bonding of the copper foil to the resin. Blistering was noted at the higher postbake temperatures. It was concluded that the bismaleimidedicyandiamide resin would not produce a satisfactory laminate.

What is claimed is:

1. A thermosetting resin composition substantially free of a polymerization catalyst consisting essentially of:

(a) a bisimide having the formula:

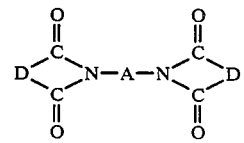

where:

A represents alkylene radicals having 1 to 20 carbon atoms, cycloalkylene radicals having 4 to 40 carbon atoms, heterocyclic radicals containing at least one of O, S, and N, phenylene or polycyclic aromatic radicals.

D represents divalent radicals containing a carbon-carbon double bond (b) a polyphenol;

(c) dicyandiamide, where the weights of (a), (b), and (c) are 80 to 98%/1 to 10%/and 0.1 to 10%, respectively, based on the total weight of (a), (b), and (c).

2. A thermosetting resin composition of claim 1 consisting essentially of:

(a) a bismaleimide;

(b) a bisphenol or a vinyl benzyl ether of a bisphenol; and, (c) dicyandiamide.

3. A thermosetting resin of claim 1 wherein the weights of (a), (b), and (c) are 94 to 98%/1 to 2%/ and 1.5 to 3% respectively.

4. A thermosetting resin composition of claim 2 wherein (a) is:

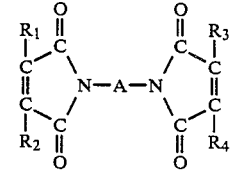

where:

A represents —C$_6$H$_4$—CH$_2$—C$_6$H$_4$—, —C$_6$H$_4$—C(CH$_3$)$_2$—C$_6$H$_4$—, -continued

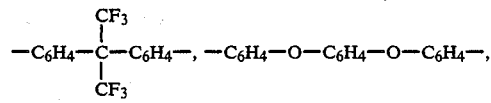

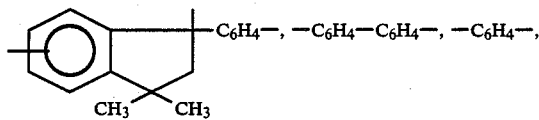

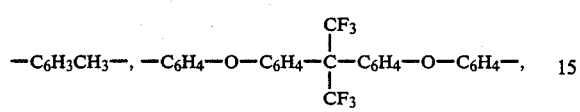

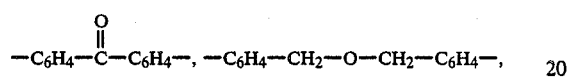

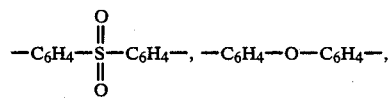

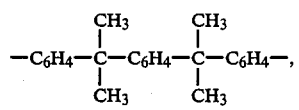

$R_1, R_2, R_3, R_4$ represent H, $CH_3$, $C_2H_5$, $C_3H_7$, $C_4H_9$, $C_5H_{11}$ (b) is:

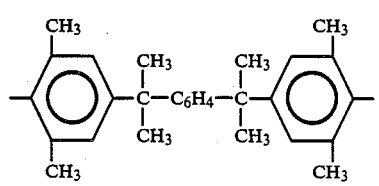

where

Z represents H, $CH_2 = CH-C_6H_4-CH_2-$

E represents 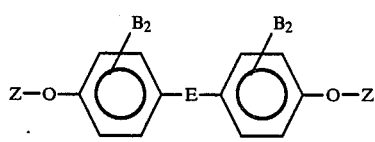

or E represents a sigma bond

B represents H, Br, $CH_3$

5. A thermosetting resin composition of claim 4 where (a) is 1–10 mols, (b) is greater than zero to 1 mols, and (c) is greater than zero to 2 mols.

6. A thermosetting resin composition of claim 4 wherein (a) is:

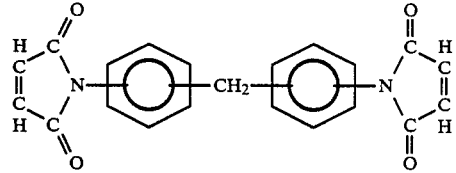

and (b) is:

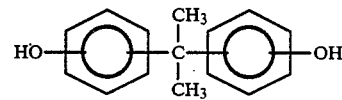

or

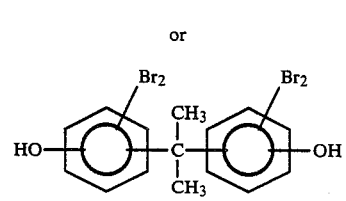

7. A thermosetting resin composition of claim 4 wherein (a) is:

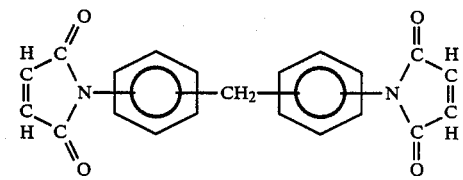

and (b) is

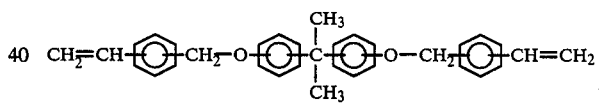

or

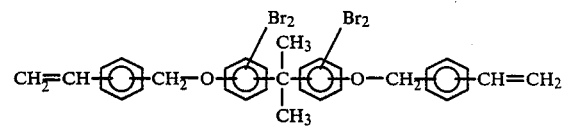

8. A thermosetting resin composition of claim 4 wherein (a) is:

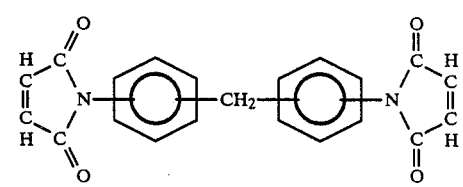

and (b) is:

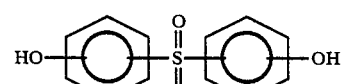

-continued
or

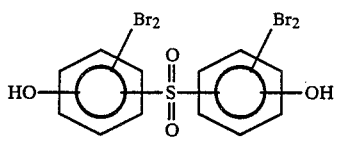

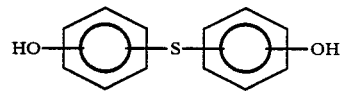

or

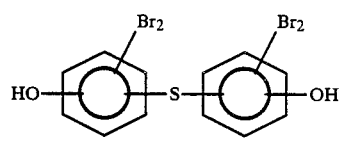

9. A thermosetting resin composition of claim 8 wherein (a) is:

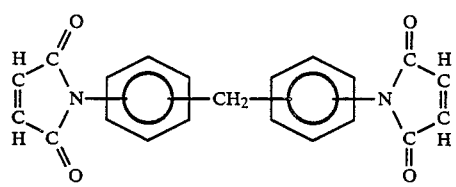

11. A thermosetting resin of claim 8 wherein (a) is:

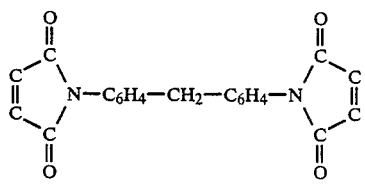

and (b) is:

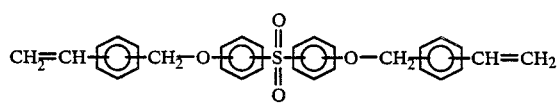

and (b) is:

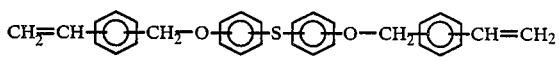

or

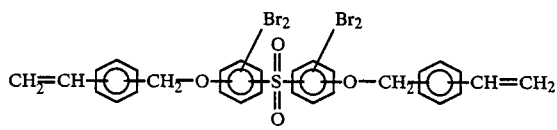

or

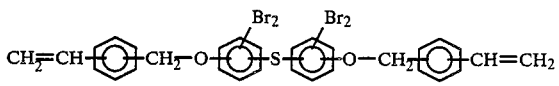

10. A thermosetting resin of claim 4 wherein (a) is:

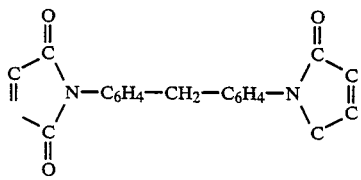

and (b) is:

12. A method of making the prepolymer of the thermosetting resin of claim 4 comprising reacting 80-98 weight percent of (a), 1-10 weight percent of (b), and 0.1-10% weight percent of (c) in a suitable solvent at a temperature of about 120°–140° C. for a sufficient period of time to obtain the desired degree of polymerization.

13. The method of claim 12 wherein the weights of (a), (b), and (c) are 94-98%, 1-2%, and 1.5-3% respectively.

14. The method of claim 12 wherein the solvent is at least one member of the group consisting of dimethyl formamide, N-methyl pyrrolidone, dimethyl acetamide, acetone, benzene and toluene.

* * * * *

UNITED STATES PATENT AND TRADEMARK OFFICE
CERTIFICATE OF CORRECTION

PATENT NO. : 4,876,325

DATED : October 24, 1989

INVENTOR(S) : Larry D. Olson and Eugene P. Pallardy

It is certified that error appears in the above-identified patent and that said Letters Patent is hereby corrected as shown below:

Column 2, line 15: "styreneter-minated" should read --styrene-terminated--.

line 61: that portion of the formula "...$C_4H_4$-" should read -- $C_6H_4$- --

Column 3, line 50: "and a sigma bond B = H, Br, $CH_3$" is unclear. It should read: --and a sigma bond B = H, Br, $CH_3$ --

Column 4, line 5: "Bisimides" is a heading and should be noted as such.

line 22: "Resin" should read --Resins-- line 40: "Dicyandiamide" is a heading and should be noted as such.

line 41: "The compound" should read --This compound--

Column 5, line 3,4: that portion of the formula "E = $CH_3$-C-$CH_3$" should read -- E = $CH_3$-C-$CH_3$ --

Column 5, line 7: "and a sigma bond B = H, Br, $CH_3$" is unclear. It should read: --and a sigma bond B = H, Br, $CH_3$ --

UNITED STATES PATENT AND TRADEMARK OFFICE
CERTIFICATE OF CORRECTION

PATENT NO. : 4,876,325            Page 2 of 5
DATED : October 24, 1989
INVENTOR(S) : Larry D. Olson and Eugene P. Pallardy It is certified that error appears in the above-identified patent and that said Letters Patent is hereby corrected as shown below:

Column 5, line 55:    that portion of the formula "...$C_4H_4$-"
                       should read -- $C_6H_4$- --

Column 6, lines 42,43:   that portion of the formula $$\text{"E} = CH_3-\overset{|}{\underset{|}{C}}-CH_3\text{" should read -- E} = \overset{|}{\underset{|}{CH_3}}-C-CH_3 \text{ --}$$

line 46:   "and a sigma bond B = H, Br, $CH_3$" is unclear.
                  It should read: --and a sigma bond
                               B = H, Br, $CH_3$ --

Column 7, line 33:   "components of the resin was" should read
                    --components of the resin were--
       line 64:   "B-stages" should read --B-staged--

Column 9, line 48:   "CibaGeigy" should read --Ciba-Geigy--
       line 59:   "Resin gel time time" should read
                --Resin gel time--

Column 12, line 12:   "bismaleimidedicyandiamide" should read
                     --bismaleimide-dicyandiamide--

UNITED STATES PATENT AND TRADEMARK OFFICE
CERTIFICATE OF CORRECTION

PATENT NO. : 4,876,325

DATED : October 24, 1989

INVENTOR(S) : Larry D. Olson and Eugene P. Pallardy

It is certified that error appears in the above-identified patent and that said Letters Patent is hereby corrected as shown below:

Column 15, line 46: the formula

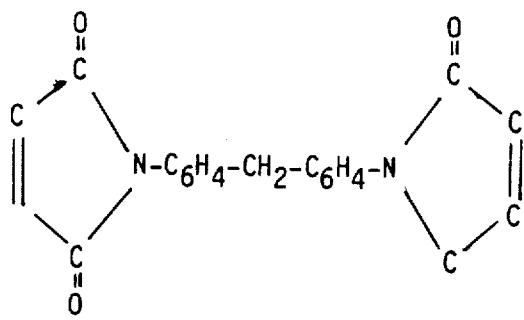     should read

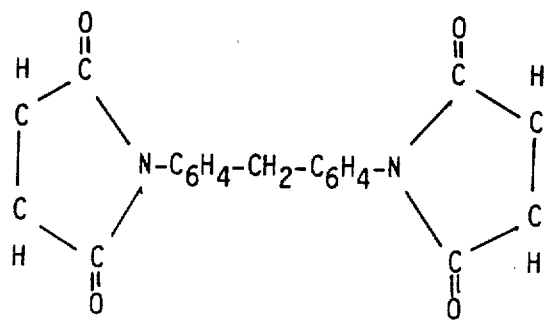

UNITED STATES PATENT AND TRADEMARK OFFICE
CERTIFICATE OF CORRECTION

PATENT NO. : 4,876,325                                  Page 4 of 5

DATED      : October 24, 1989

INVENTOR(S) : Larry D. Olson and Eugene P. Pallardy

It is certified that error appears in the above-identified patent and that said Letters Patent is hereby corrected as shown below:

Column 16, line 20:  the formula

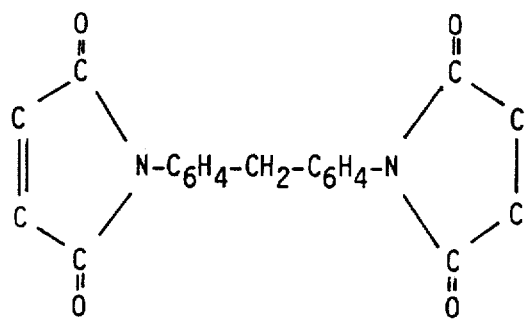   should read

UNITED STATES PATENT AND TRADEMARK OFFICE
CERTIFICATE OF CORRECTION

PATENT NO.  : 4,876,325

DATED       : October 24, 1989

INVENTOR(S) : Larry D. Olson and Eugene P. Pallardy

It is certified that error appears in the above-identified patent and that said Letters Patent is hereby corrected as shown below:

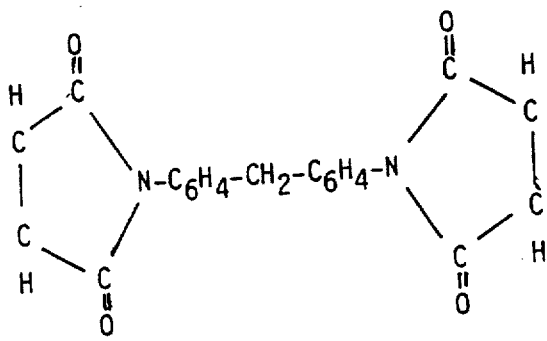

Signed and Sealed this

Eighteenth Day of December, 1990

*Attest:*

HARRY F. MANBECK, JR.

*Attesting Officer*  *Commissioner of Patents and Trademarks*